(12) United States Patent
Louvat et al.

US011068630B2

(10) Patent No.: US 11,068,630 B2
(45) Date of Patent: Jul. 20, 2021

(54) SYNCHRONOUS DEVICE WITH SLACK GUARD CIRCUIT

(71) Applicant: Dolphin Design, Meylan (FR)

(72) Inventors: Mathieu Louvat, Grenoble (FR); Lionel Jure, Domene (FR); Vincent Huard, Saint-Nazaire-les-Eymes (FR)

(73) Assignee: Dolphin Design, Meylan (FR)

( * ) Notice: Subject to any disclaimer, the term of this patent is extended or adjusted under 35 U.S.C. 154(b) by 0 days.

(21) Appl. No.: 16/723,069

(22) Filed: Dec. 20, 2019

(65) Prior Publication Data
US 2020/0202062 A1 Jun. 25, 2020

(30) Foreign Application Priority Data

Dec. 24, 2018 (FR) .................................... 18/74138

(51) Int. Cl.
| | |
|---|---|
| *G06F 30/327* | (2020.01) |
| *G06F 30/3312* | (2020.01) |
| *H03K 19/00* | (2006.01) |
| *H03K 19/017* | (2006.01) |
| *H03K 19/096* | (2006.01) |
| *G06F 119/12* | (2020.01) |
| *G06F 117/04* | (2020.01) |

(52) U.S. Cl.
CPC ........ *G06F 30/327* (2020.01); *G06F 30/3312* (2020.01); *H03K 19/01728* (2013.01); *H03K 19/096* (2013.01); *G06F 2117/04* (2020.01); *G06F 2119/12* (2020.01)

(58) Field of Classification Search
CPC ............... G06F 30/327; G06F 30/3312; G06F 2119/12; G06F 2117/04; H03K 19/01728; H03K 19/096; H01L 25/00

USPC ...... 716/101, 108, 113, 136; 326/31, 41, 47, 326/101, 93; 257/798

See application file for complete search history.

(56) References Cited

U.S. PATENT DOCUMENTS

| 3,865,981 | A | * | 2/1975 | Welch | H04L 7/0083 375/357 |
| 4,441,098 | A | * | 4/1984 | Borras | H03C 3/0933 340/13.37 |
| 4,472,820 | A | * | 9/1984 | Borras | H03C 3/0933 331/1 A |

(Continued)

FOREIGN PATENT DOCUMENTS

EP 3176713 A1 6/2017

OTHER PUBLICATIONS

Chellappa, "Radiation Hardened Clock Design", Arizona State University, Aug. 2015, 219 pages. (Year: 2015).*

(Continued)

*Primary Examiner* — Phallaka Kik
(74) *Attorney, Agent, or Firm* — The Noblitt Group, PLLC (57) ABSTRACT

Embodiments of the present technology provide a synchronous device. The synchronous device provides a first latch configured to store a data input signal during a first state of a first clock signal and a slack guard circuit. The slack guard circuit provides a delay element coupled to the first latch and configured to generate a delayed data signal, a gated-input cell coupled to the delay element and configured to propagate the delayed data signal during the first state of the first clock signal, and a comparator coupled to the first latch and the gated-input cell.

15 Claims, 4 Drawing Sheets

(56) References Cited

U.S. PATENT DOCUMENTS

| | | | | |
|---|---|---|---|---|
| 4,477,919 | A * | 10/1984 | Borras | H03C 3/0933 377/26 |
| 6,817,006 | B1 * | 11/2004 | Wells | G01R 31/318519 716/112 |
| 10,354,029 | B2 * | 7/2019 | Miro Panades | G06F 30/392 |
| 2004/0216081 | A1 * | 10/2004 | Wells | G06F 30/34 716/117 |
| 2010/0085675 | A1 * | 4/2010 | Oki | H03K 17/162 361/101 |
| 2011/0191646 | A1 * | 8/2011 | Louri | G06F 11/08 714/746 |
| 2017/0184664 | A1 * | 6/2017 | Nicolaidis | G01R 31/31703 |
| 2018/0277594 | A1 * | 9/2018 | Kanda | H01L 27/2436 |
| 2019/0187208 | A1 * | 6/2019 | Agarwal | G01R 31/3177 |

OTHER PUBLICATIONS

Miro Panades Ivan, EPO Patent Document No. EP-3176713-A1, published Jun. 7, 2017, abstract. (Year: 2017).*
Kunitake et al., "A Selective Replacement Method for Timing-Error-Predicting Flip-Flops," Circuits and Systems (MWSCAS), 2011 IEEE 54th International Midwest Symposium, Aug. 7, 2011.

* cited by examiner

SYNCHRONOUS DEVICE WITH SLACK GUARD CIRCUIT

The present patent application claims priority from the French patent application filed on 24 Dec. 2018 and assigned application no. FR1874138, the contents of which is hereby incorporated by reference.

TECHNICAL FIELD

The present disclosure relates generally to the field of integrated circuits, and in particular to a synchronous device comprising a slack guard circuit.

BACKGROUND ART

It has been proposed to improve circuit performance and/or reduce energy consumption by modifying clock frequencies and/or supply voltages supplied to areas of integrated circuits. However, beyond a certain operating point corresponding to a clock frequency and supply voltage limit, the circuit will no longer function correctly.

In particular, an integrated circuit will no longer maintain correct functionality if one or more of its synchronous devices are subjected to timing violations. Synchronous devices include registers, flip-flops, memories and latches. Such devices are generally characterized by a setup time tS that should be respected in order to ensure stability. The setup time tS defines a time period before a significant clock edge during which the input data of the synchronous device should not change. A timing violation occurs if the setup time is not respected.

A static timing analysis of an integrated circuit design can identify one or more critical transmission paths, which are the transmission paths with the longest propagation delays between two synchronous devices in the circuit. The propagation delays on these critical transmission paths are generally used to determine the maximum permitted clock frequency of the circuit.

A publication by Y. Kanitake et al. entitled "Possibilities to Miss Predicting Timing Errors in Canary Flip-flops", IEEE, Jan. 7, 2011, proposes solutions for improving circuit performance by incorporating detection circuits in an integrated circuit, the detection circuits detecting when timing violations occur such that the level of the supply voltage can be modified accordingly.

One type of detection circuit that has been proposed for detecting potential timing violations is a slack monitor. Such a device determines when the slack time, defined as the time margin before a timing violation occurs, falls below a given threshold.

Existing slack monitor circuit designs tend to have a relatively large surface area, or suffer from other drawbacks. There is thus a need in the art for a new type of slack monitor circuit having a relatively low surface area and/or providing other advantages with respect to existing solutions.

SUMMARY OF INVENTION

It is one aim of embodiments of the present disclosure to at least partially address one or more needs in the prior art.

According to one embodiment, there is provided a synchronous device comprising: a first latch having a data input receiving a data input signal, the first latch being configured to store the data input signal during a first state of a first clock signal; and a slack guard circuit comprising: a delay element having an input coupled to the data input of the first latch and configured to generate, at its output, a delayed data signal; a gated-input cell having an input coupled to an output of the delay element, the gated-input cell being configured to propagate the delayed data signal during the first state of the first clock signal; and a comparator having a first input coupled to a data output of the first latch and a second input coupled to an output of the gated-input cell.

According to one embodiment, the input of the delay element is connected to the data input of the first latch.

According to one embodiment, the synchronous device further comprises a further latch having a data input coupled to an output of the comparator, the further latch being configured to store an output signal of the comparator during a second state of the first clock signal.

According to one embodiment, the further latch is configured to receive a second clock signal corresponding to the inverse of the first clock signal.

According to one embodiment, the synchronous device further comprises a further logic gate for forcing one input of the comparator to a high or low state during a testing phase of the slack guard circuit.

According to one embodiment, the logic gate is an AND gate or a NAND gate.

According to one embodiment, the comparator is an XOR gate or an XNOR gate.

According to one embodiment, the gated-input cell comprises at least one transistor connecting the input of the gated-input cell to an output of the gated-input cell, the at least one transistor being controlled based on the first clock signal.

According to one embodiment, the gated-input cell comprises a pass gate.

According to one embodiment, the gated-input cell further comprises an inverter connecting the output of the pass gate to the second input of the comparator.

According to one embodiment, the synchronous device further comprises a multiplexer having a first input coupled to a data input of the synchronous device, a second input coupled to a test input of the synchronous device, and an output providing the data input signal of the first latch.

According to one embodiment, the synchronous device further comprises a second latch having a data input coupled to the data output of the first latch, the second latch being configured to store an output data signal of the first latch during a second state of the first clock signal.

According to one embodiment, there is provided a non-transitory storage medium storing a standard cell library defining at least one standard cell for implementing the above synchronous device.

According to one embodiment, there is provided a method of circuit conception implemented by a computer, the method comprising performing static timing analysis on a circuit design to identify at least one synchronous device receiving a data signal with a slack time of less than a threshold duration with respect to a timing edge of a clock signal, and replacing the at least one synchronous device in the circuit design by a modified cell implementing the above synchronous device.

According to one embodiment, there is provided a computing device configured to execute a computer program causing the above method to be implemented.

BRIEF DESCRIPTION OF DRAWINGS

The foregoing features and advantages, as well as others, will be described in detail in the following description of specific embodiments given by way of illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements. Furthermore, in the following, unless indicated otherwise, each time the term "coupled", or one of its derivatives, is used, it should be understood that the link in question is capable of being implemented by a direct connection.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
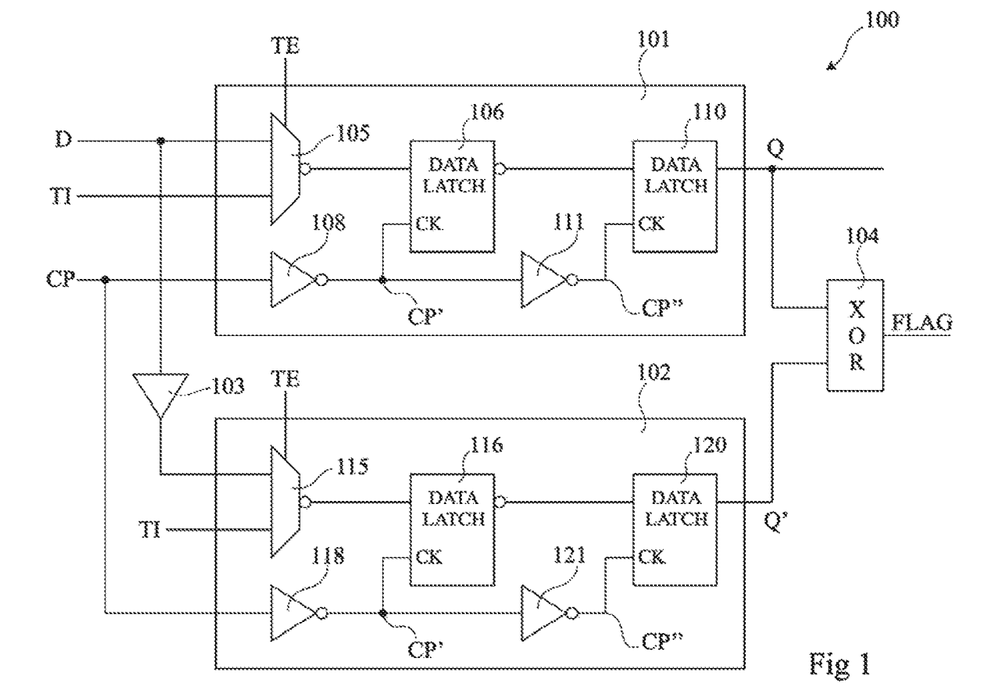
FIG. 1 schematically illustrates a synchronous device and a slack monitor according to a solution that has been proposed.

FIG. 1 schematically illustrates a circuit 100 comprising a synchronous device 101, and a slack monitor comprising a further synchronous device 102, a delay element 103 and a comparison element 104, according to an implementation that has been proposed.

The synchronous device 101 for example comprises a data input receiving a data signal D, a clock input receiving a clock signal CP, a test input receiving a test input signal TI and a test enable input receiving a test enable signal TE.

The synchronous device 101 for example comprises a multiplexor 105 having one of its data inputs connected to the data input of the device 101, the other of its data inputs connected to the test input of the device 101, and its control input connected to the test enable input. An inverted output of the multiplexer 105 is connected to the data input of a latch (DATA LATCH) 106, which is clocked by a clock signal CP' corresponding to the clock signal CP inverted by an inverter 108. An inverted output of the data latch 106 is connected to the data input of a further data latch (DATA LATCH) 110, which is clocked by a clock signal CP" corresponding to the clock signal CP' inverted by an inverter 111.

The synchronous device 102 for example comprises identical elements to those of the synchronous device 101, the elements of the device 102 corresponding to the elements 105 to 111 of the device 101 being respectively labelled 115 to 221. One of the data inputs of the multiplexer 115 of the synchronous device 102 is connected to a test data input, and the other data input is connected to the data input of the synchronous device 101 via the delay element 103 introducing a delay.

The data output signal Q of the synchronous device 101 and the data output signal Q' of the synchronous device 102, which are respectively provided by the data outputs of the latches 110 and 120, are provided to corresponding inputs of an exclusive-OR (XOR) gate implementing the comparison element 104. The XOR gate 104 generates an output signal FLAG indicating when the slack time has fallen below a given threshold.

There are several drawbacks of the slack monitor of the circuit 100 of FIG. 1. For example, the slack monitor is relatively large, comprising substantially a complete duplication of the elements of the synchronous device 101. Furthermore, it results in additional loading of the data and clock inputs, and of the data output, of the synchronous device 101, resulting in a reduction in performance.

Figure 2:
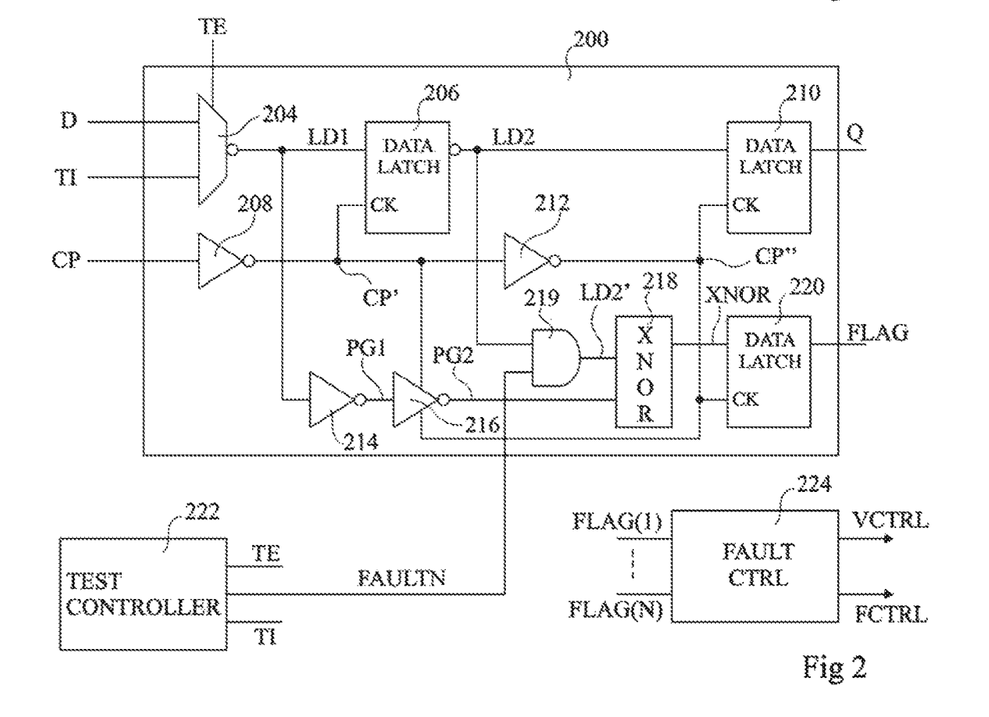
FIG. 2 schematically illustrates a synchronous device with a slack guard circuit according to an example embodiment of the present disclosure.

FIG. 2 schematically illustrates a synchronous device 200 with an integrated slack monitor, which will be referred to herein as a slack guard circuit, according to an example embodiment of the present disclosure.

The synchronous device 200 comprises a data input receiving an input data signal D, a clock input receiving a clock signal CP, a test data input receiving a test input signal TI, and a test enable input receiving a test enable signal TE. The synchronous device 200 for example comprises a multiplexor 204 having one of its data inputs coupled to the data input of the synchronous device 200, and its other data input coupled to the test input of the synchronous device 200. Of course, in alternative embodiments, no test input is provided, allowing the multiplexer 204 to be omitted.

An inverted data output of the multiplexer 204, providing a data signal LD1, is for example coupled to a data input of a latch (DATA LATCH) 206. The latch 206 is for example clocked by a clock signal CP', corresponding to the input clock signal CP of the synchronous device 200 inverted by an inverter 208.

An inverted data output of the latch 206, providing a data signal LD2, is for example coupled to a data input of a further latch (DATA LATCH) 210. The latch 210 is for example clocked by a clock signal CP", corresponding to the clock signal CP' inverted by an inverter 212. The latch 210 provides, at its output, the output data signal Q of the synchronous device 200.

The elements 204 to 212 described above correspond to elements implementing a standard function of the synchronous device 200, which is for example a D-type flip-flop. In alternative embodiments, a different type of synchronous device could be implemented, such as an RS flip-flop, etc.

The slack guard circuit of the synchronous device 200 for example comprises a delay element 214, a gated-input cell 216, which in the example of FIG. 2 is an inverting pass gate, a comparator 218, which in the example of FIG. 2 is an XNOR (XNOR) gate, an AND gate 219 and a flag latch (FLAG LATCH) 220.

The delay element 214 is for example implemented by an inverter having its input connected to the data input of the latch 206 in order to receive the data signal LD1. An output of the inverter 214 provides a signal PG1, and is for example coupled to the input of the inverting pass gate 216. The inverting pass gate 216 is for example controlled by the clock signals CP' and CP", although in alternative embodiments it could be controlled by the clock signals CP and CP'. An output of the inverting pass gate 216 is for example coupled, or connected, to an input of the XNOR gate 218. The other input of the XNOR gate 218 is for example coupled to the data output of the latch 206 in order to receive the data signal LD2. In some embodiments, the signal LD2 is provided to the input of the XNOR gate 218 via an AND gate 219 having one of its input coupled to the data output of the latch 206, and its other input receiving a signal FAULTN permitting the testing of the slack guard circuit, as will be described in more detail below. Thus, while the signal FAULTN is at a high state, the signal LD2' at the output of the AND gate 219 is equal to the signal LD2, whereas when the signal FAULTN is low, the signal LD2' is forced low. Of course, the gate 219 could be implemented by another type of logic function, such as a NAND gate, depending on whether or not the delay element 214 inverts the data signal LD1. In other embodiments, the AND gate 219 is omitted, and the output line LD2 of the latch 206 is connected directly to the input of the comparator 218. In yet further embodiments, the AND gate 219, or another type of logic function, is instead placed between the output of the inverting pass gate 216 and the other input of the comparator 218.

An output of the XNOR gate 218 provides a signal XNOR, and is for example coupled to a data input of the latch 220. The latch 220 is for example clocked by the clock signal CP", and a data output of the latch 220 provides the signal FLAG, which is for example available at an output of the synchronous device 200.

In alternative embodiments, the delay element 214 could be implemented by a non-inverting buffer formed for example by the series connection of two or more inverters. Additionally or alternatively, the pass gate 216 could be a non-inverting pass gate or any other cell, for example a cell of greater complexity relying on data clocking, such as a latch. In the case that the signal PG2 corresponds to the mirror of the data input signal D rather than the inverse of the data input signal D, the XNOR gate 218 is for example replaced by an XOR gate.

As also represented in FIG. 2, in some embodiments, a test controller (TEST CONTROLLER) 222 is provided, that for example provides the test enable signal TE and/or the test input signal TI to the synchronous devices 200, and to one or more similar devices (not illustrated). Of course, it will be understood by those skilled in the art that in practice the test inputs of a plurality of synchronous devices such as the device 200 may be daisy-chained for test purposes.

The test controller 222 also for example provides a signal FAULTN to the AND gate 219, this signal for example forcing one input of the comparator 218 to a high or low state, and thus permitting the testing of a slack guard circuit and also of a fault control circuit 224 described in more detail below. For example, when the signal FAULTN is asserted low during a test phase, the XNOR gate 218 will be transformed into a buffer, causing the signal FLAG to be the mirror of the signal PG2.

By providing the slack guard circuit within the synchronous device 200, the signal FLAG provides a warning flag indicating when a timing violation risks occurring at the device 200.

In some embodiments, a fault control circuit (FAULT CTRL) 224 is provided, which receives the flag signal FLAG generated by one or more synchronous devices 200, an example of N flag signals FLAG(1) to FLAG(N) being illustrated in FIG. 2. The circuit 224 is for example configured to detect whether any of the FLAG signals is asserted, and if so, to provide a responsive action. For example, the responsive action could be to reduce the frequency of the clock signal CP using a control signal FCTRL, and/or to increase the supply voltage of the circuit comprising the synchronous device 200 using a control signal VCTRL.

Operation of the synchronous device 200 of FIG. 2 will now be described in more detail with reference to the timing diagrams of FIGS. 3 and 4.

Figure 3:
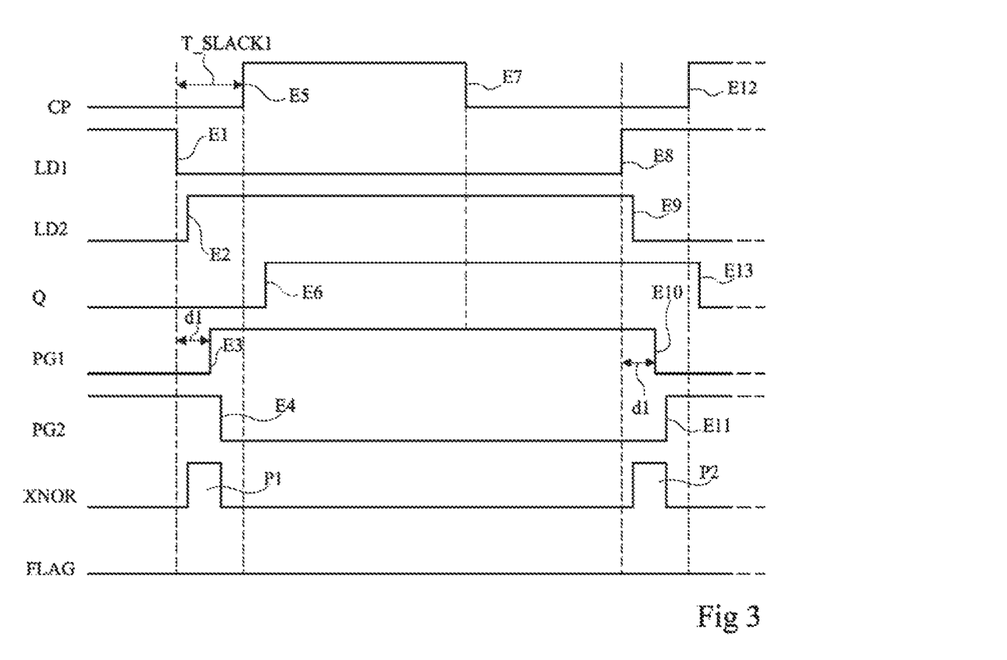
FIG. 3 is a timing diagram representing signals in the synchronous device of FIG. 2 according to a first example embodiment.

FIG. 3 is a timing diagram representing the signals CP, LD1, LD2, Q, PG1, PG2, XNOR and FLAG in the synchronous device 200 according to a first example embodiment in which the occurrence of a timing violation is not identified as being close and the signal FLAG is not asserted.

In the example of FIG. 3, there is a falling edge E1 of the signal LD1, for example resulting from a rising edge of the input data signal D or of the test input signal TI. The edge E1 for example arrives while the clock signal CP is low, and thus the state of the signal LD1 is stored by the latch 206, causing a rising edge E2 of the signal LD2 shortly after the edge E1. The signal PG1 is initially low in view of the high state of the signal LD1, and then has a rising edge E3 a time delay d1 after the edge E1. The time delay d1 corresponds to the delay introduced by the inverter 214. For example, in some embodiments, the inverter 214 is sized in order to provide a higher time delay than a standard inverter in the circuit.

As the edge E3 arrives while the clock signal CP is still low, the edge E3 is passed by the inverting pass gate 216, resulting in a falling edge E4 of the signal PG2 shortly after the edge E3.

A rising edge E5 of the clock signal CP for example arrives after all of the edges E1 to E4. The Q output of the synchronous device 200 for example has a rising edge E6 shortly after the edge E5 of the clock signal CP. The signal XNOR for example has a pulse P1 between the edges E2 and E4 of the signals LD2 and PG2 respectively, but this pulse will not be taken into account by the latch 220, as the pulse P1 falls low before the edge E5 of the clock signal CP.

Indeed, in the example of FIG. 3, the slack time T_SLACK1 between the falling edge E1 of the signal LD1 and the rising edge E5 of the clock signal CP is longer than the time delay d1. This time delay d1 for example defines the threshold value below which the signal FLAG is not asserted.

FIG. 3 also illustrates the case of a rising edge of the data signal LD1, which is for example treated in a similar manner to the falling edge, as will now be described.

The clock signal CP for example has a falling edge E7 causing the latch 210 to maintain the previously stored value.

The signal LD1 then for example has a rising edge E8 while the clock signal CP is low, and thus the signal LD2 for example has a falling edge E9 shortly thereafter. Furthermore, the signal PG1 has a corresponding falling edge E10 after the delay d1 from the edge E8 introduced by the delay element 214. The signal PG2 thus has a rising edge E11 shortly thereafter. The edges E8 to E11 occurring before a subsequent rising edge E12 of the clock signal CP, the signal Q at the output of the synchronous device 200 clocks the new state of the data signal and has a corresponding falling edge E13 shortly after the rising clock edge E12.

The signal XNOR for example has a pulse P2 between the edges E9 and E11 of the signals LD2 and PG2 respectively, but as the pulse P2 falls low before the edge E12 of the clock signal CP, this pulse will not be taken into account by the latch 220.

Figure 4:
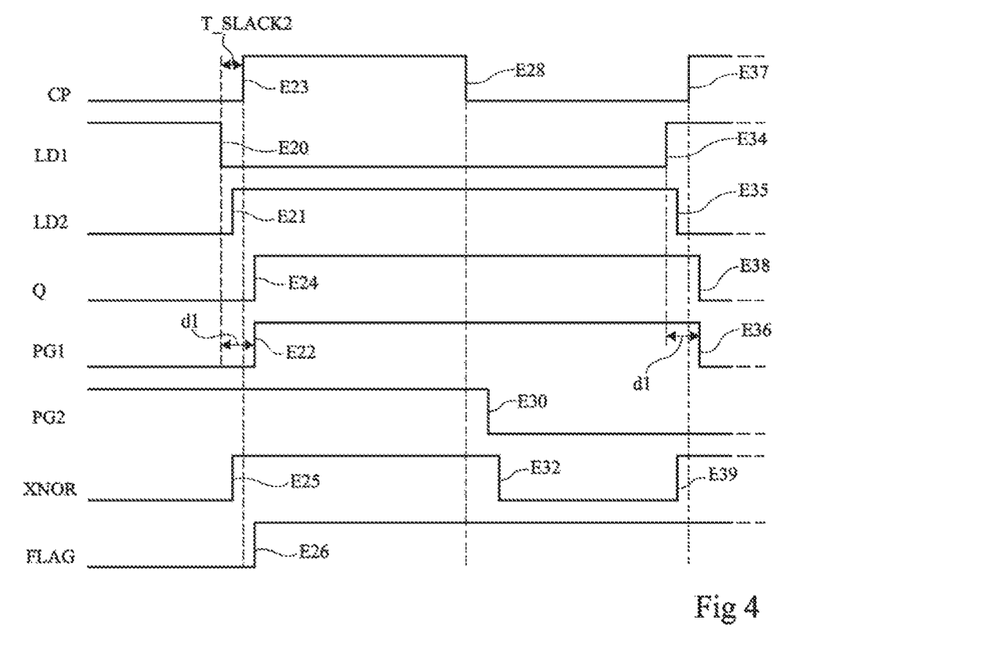
FIG. 4 is a timing diagram representing signals in the synchronous device of FIG. 2 according to a second example embodiment.

FIG. 4 is a timing diagram illustrating the same signals as those of FIG. 3, but according to an example in which a timing violation is detected as being close, and the warning signal FLAG is thus asserted.

The signal LD1 for example has a falling edge E20 while the signal CP is low, and thus the signal LD2 has a corresponding rising edge E21 shortly thereafter. The signal PG1 also has a rising edge E22 after the time delay d1 from the rising edge E20.

However, in the example of FIG. 4, a rising edge E23 of the clock signal CP occurs after the edge E20 of the signal LD1, but before the rising edge E22 of the signal PG1. Thus, while the signal Q has a rising edge E24 shortly after the clock edge E23, the signal PG2 remains high. This means that the signal XNOR has a rising edge E25 shortly after the edge E21 of the signal LD2. The signal XNOR remains high until after a subsequent falling edge E28 of the clock signal CP, and in particular until a falling edge E30 of the signal PG2 resulting from the high state of the signal PG1. Thus, the signal XNOR has a falling edge E32 shortly after the edge E30.

The signal FLAG is thus asserted at a rising edge E26 shortly after the rising edge E23 of the clock signal CP.

Indeed, in the example of FIG. 4, the slack time T_SLACK2 between the falling edge E20 of the signal LD1 and the rising edge E23 of the clock signal CP is lower than the threshold defined by the time delay d1.

A similar situation for example occurs at a rising edge of the data signal LD1, as will now be described. For example, the signal LD1 has a rising edge E34 occurring while the clock signal CP is low, and the signal LD2 thus has a falling edge E35 shortly thereafter. The signal PG1 has a falling edge E36 after the time delay d1 from the edge E34, but the rising edge E37 of the clock signal CP occurs after the rising edge E34 of the signal LD1, but before the falling edge E36 of the signal PG1. Therefore, while the signal Q has a falling edge E38 shortly after the rising edge E37 of the clock signal CP, the signal PG2 remains low, and the signal XNOR has a rising edge E39 shortly after the falling edge E35 of the signal LD2. Thus, the signal FLAG remains high at the rising edge E37 of the clock signal CP.

Figure 5:
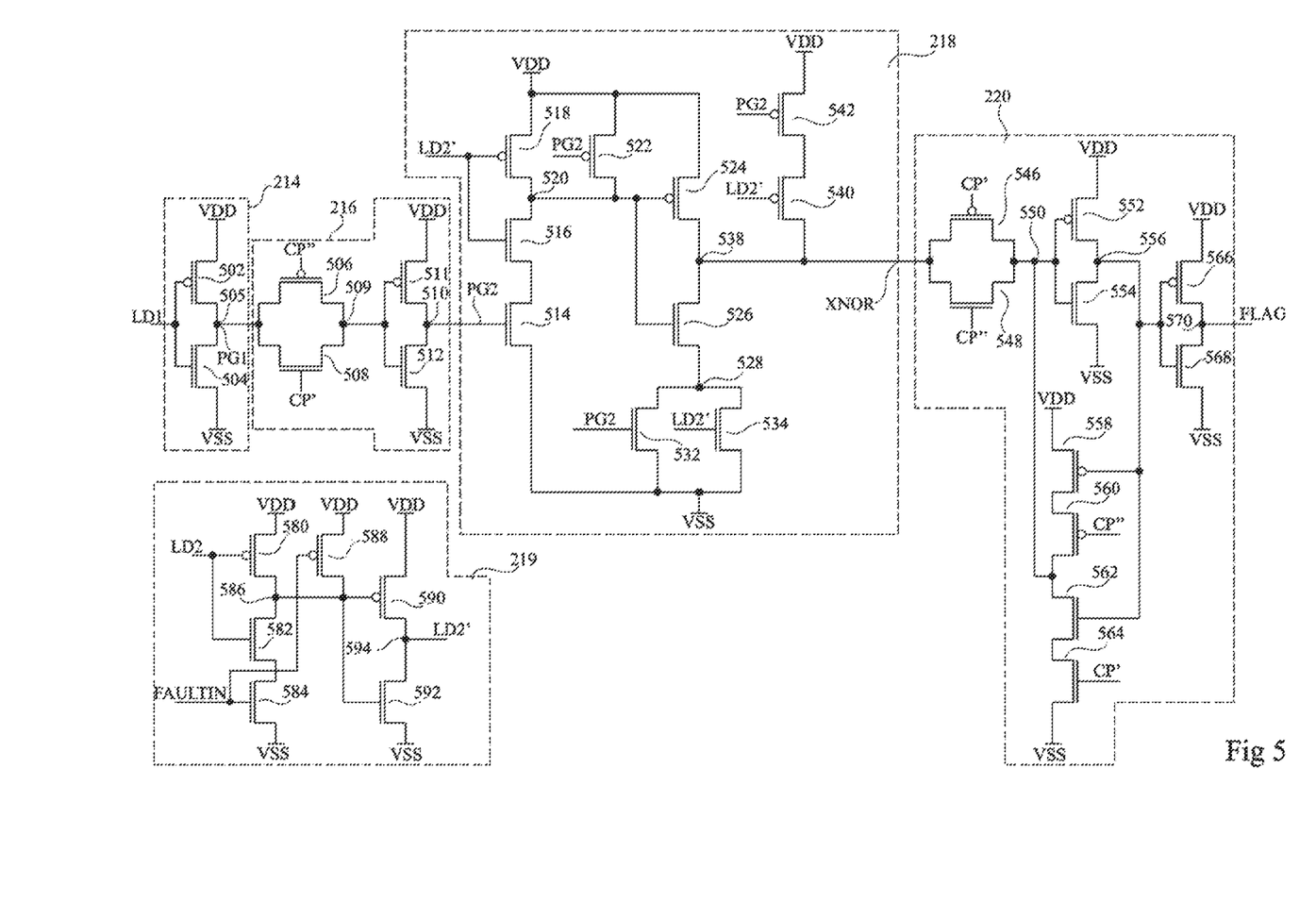
FIG. 5 is a circuit diagram illustrating an implementation of the slack guard circuit of FIG. 2 according to an example embodiment of the present disclosure.

FIG. 5 is a circuit diagram providing an example implementation of the elements 214, 216, 218, 219 and 220 forming the slack guard circuit of the synchronous device 200.

The inverter 214 is for example implemented by a PMOS transistor 502 and an NMOS transistor 504 coupled in series by their main current conducting nodes between voltage rails VDD and VSS. The gates of these transistors receive the signal LD1 at the output of the multiplexer 204. An intermediate node 505 between these transistors provides the signal PG1.

The node 505 is coupled to an input of the inverting pass gate 216, which in the example of FIG. 5 is implemented by a pass gate formed by a PMOS transistor 506 and an NMOS transistor 508 coupled in parallel by their main current conducting nodes between the node 505 and a further node 509. The gate of the NMOS transistor 508 for example receives the clock signal CP', and the gate of the PMOS transistor 506 for example receives the clock signal CP'', such that the pass gate conducts when the clock signal CP' is high.

The inverting pass gate 216 also comprises an inverter coupled between the node 509 and an output node 510, the inverter for example being formed by a PMOS transistor 511 and an NMOS transistor 512 coupled in series by their main current conducting nodes between the voltage rails VDD and VSS. The output node 510 for example provides the signal PG2.

The output node 510 is coupled to an input of the XNOR gate 218, for example to the gate of an NMOS transistor 514 of the XNOR gate 218. The transistor 514 for example has one of its main current conducting nodes coupled to the voltage rail VSS, and its other main conducting node coupled to the voltage rail VDD via a further NMOS transistor 516 and a PMOS transistor 518 coupled in series by their main current conducting nodes. An intermediate node 520 between the transistors 516 and 518 is for example coupled to the voltage rail VDD via the main current conducting nodes of a transistor 522, and to the gate nodes of a PMOS transistor 524 and an NMOS transistor 526. The transistors 524 and 526 are for example coupled in series by their main current conducting nodes between the voltage rail VDD and a further node 528. An intermediate node 538 is between these transistors 524 and 526. The node 528 is coupled to the voltage rail VSS via NMOS transistors 532 and 534, which are for example coupled in parallel by the main conducting nodes. The node 538 is further coupled to the voltage rail VDD via a pair of PMOS transistors 540 and 542 coupled in series by their main current conducting nodes.

The gates of the transistors 516, 518, 534 and 540 for example receive the signal LD2' at the output of the AND gate 219. The gates of the transistors 522, 532 and 542 for example receive the signal PG2.

The node 538 forms an output node of the XNOR gate 218, and provides the signal XNOR. This output node 538 is for example coupled to a data input of the latch 220, which for example comprises a pass gate formed by a PMOS transistor 546 and an NMOS transistor 548 coupled between the node 538 and a further node 550. The NMOS transistor 548 is for example controlled by the clock signal CP''', while the PMOS transistor 546 is for example controlled by the clock signal CP'.

The node 550 is for example coupled to a further node 556 via an inverter formed by a PMOS transistor 552 and an NMOS transistor 554 coupled by their main current conducting nodes between the voltage rails VDD and VSS.

The node 556 is further coupled by a further synchronous inverter to the node 550, this synchronous inverter being formed by PMOS transistors 558, 560 and NMOS transistors 562 and 564 coupled in series by their main current conducting nodes between the voltage rails VDD and VSS. The transistors 558 and 562 for example have their gates coupled to the node 556, while the transistors 560 and 564 for example have their gates coupled to receive the clock signals CP''' and CP' respectively. An intermediate node between the transistors 560 and 562 is coupled to the node 550.

The node 556 is for example coupled to the output of the latch 220 via an inverter formed by a PMOS transistor 566 and an NMOS transistor 568 coupled in series by the main current conducting nodes between the voltage rails VDD and VSS. An intermediate node 570 between the transistors 566 and 568 provides the signal FLAG at the output of latch 220.

The AND gate 219 for example comprises a PMOS transistor 580, and NMOS transistors 582 and 584 coupled in series via their main conducting nodes between the voltage rails VDD and VSS. An intermediate node 586 between the transistors 580 and 582 is for example coupled to the voltage rail VDD via the main conducting nodes of a PMOS transistor 588, and to the gates of a PMOS transistor 590 and of an NMOS transistor 592. The transistors 590 and 592 are for example coupled in series via their main conducting nodes between the voltage rails VDD and VSS. An intermediate node 594 between the transistors 590 and 592 corresponds to the output of the AND gate 219, and provides the output signal LD2'. The gates of the transistors 580 and 582 are for example coupled to the data output of the latch 206 and thus receive the signal LD2. The gates of the transistors 584 and 588 for example receive the signal FAULTN.

Advantageously, as demonstrated by FIG. 5, the slack guard circuit of the synchronous device 200 can be implemented with as few as 32 transistors. Furthermore, in the case that the AND gate 219 is omitted, the slack guard circuit can for example be implemented with as few as 26 transistors.

Figure 6:
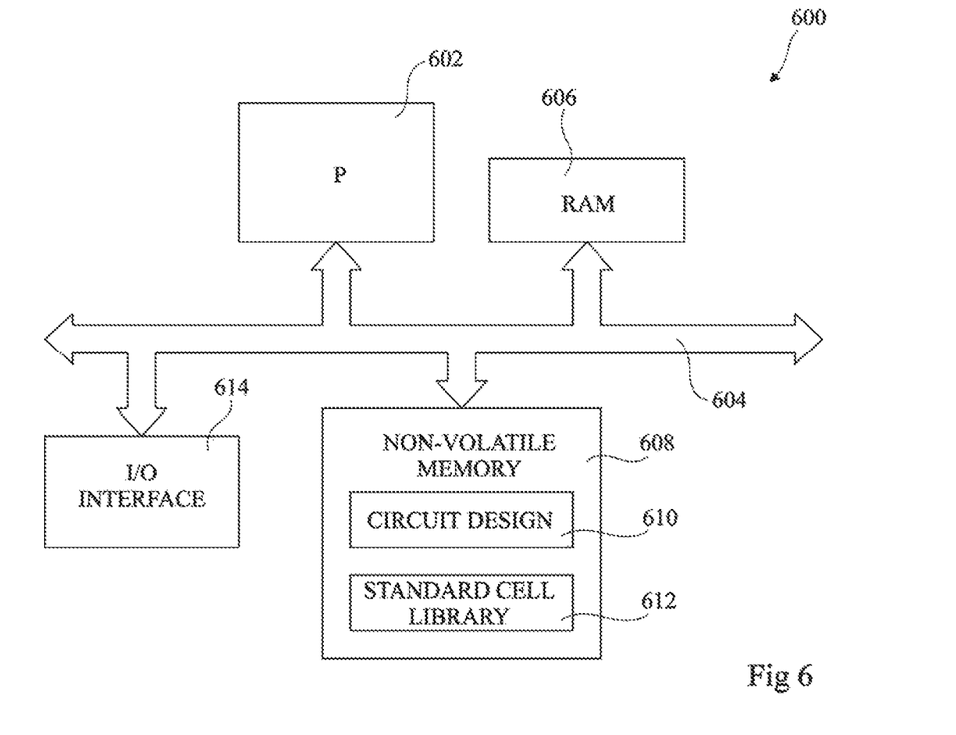
FIG. 6 schematically illustrates a computing device according to an example embodiment of the present disclosure.

FIG. 6 schematically illustrates a computing device 600 configured to perform circuit conception according to an example embodiment.

The computing device 600 for example comprises a processing device (P) 602 coupled via a bus 604 to further components including a volatile memory 606, which is for example RAM (Random Access Memory), non-volatile memory (NON-VOLATILE MEMORY) 608, which is for example a FLASH memory and stores a circuit design (CIRCUIT DESIGN) 610 and a standard cell library (STANDARD CELL LIBRARY) 612, and an input/output interface (I/O INTERFACE) 614.

According to some embodiments, a standard cell library, such as the library 612 of FIG. 6, is stored by a non-transitory storage medium such as the non-volatile memory 608, and stores standard cells to be used in a circuit design. This standard cell library for example includes at least one cell implementing the synchronous device 200 described herein above in relation with FIG. 2.

Figure 7:
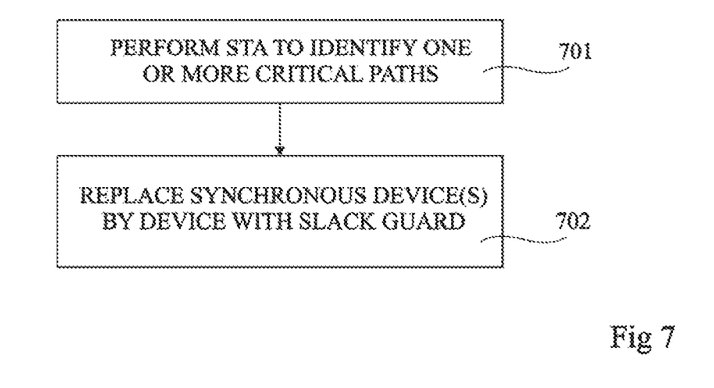
FIG. 7 is a flow diagram illustrating steps in a method of circuit conception according to an example embodiment of the present disclosure.

FIG. 7 is a flow diagram representing steps in a method of circuit conception, which is for example implemented using the computing device 600 of FIG. 6.

In an operation 701, static timing analysis (STA) is for example performed in order to identify one or more critical paths in a circuit design, such as in the circuit design 610 of FIG. 6. For example, a critical timing path is identified as being one in which the slack time measured using the static timing analysis is below a given threshold. In some embodiments, a certain percentage of the data paths of the circuit design may be defined as corresponding to critical paths.

In operation 702, one or more synchronous devices at the end of each critical path identified in the operation 701 is for example replaced by the synchronous device 200 having the slack guard circuit. The circuit design is for example transmitted to a fabrication plant for fabrication.

An advantage of the embodiments described herein is that the slack guard circuit incorporated within the synchronous device 200 does not additionally load the data or test inputs or the data output of the synchronous device 200, thereby leading to a relatively low impact on performance. Furthermore, using only a pass gate and one or more inverters in the delayed path, the circuit implementation is particularly compact, for example being implemented by 32 transistors or fewer.

Various embodiments and variants have been described. Those skilled in the art will understand that certain features of these embodiments can be combined and other variants will readily occur to those skilled in the art. For example, while embodiments have been described in relation to a D-type of flip-flop, it will be apparent to those skilled in the art that the principles described herein could be applied to any synchronous device comprising at least one data latch, and preferably a pair of data latches.

Furthermore, it will be apparent to those skilled in the art that while FIG. 5 provides one example implementation, various alternative implementations would be possible. For example, some or all of the PMOS transistors could be replaced by NMOS transistors, and vice versa. Furthermore, while the voltage rail VSS may be at a ground voltage level, in alternative embodiments it could be at a different voltage level below the voltage level on the supply voltage rail VDD, including at a negative voltage level.

Furthermore, the pass gate after the delay element could be replaced by any type of cell having a gated input, such as a latch.

The invention claimed is:

1. A synchronous device comprising:
 a first latch having a data input receiving a data input signal, the first latch being configured to store the data input signal during a first state of a first clock signal; and
 a second latch having a data input coupled to a data output of the first latch, and a data output, the second latch being configured to store an output data signal of the first latch during a second state of the first clock signal, wherein the first and second latches form a synchronous device; and
 a slack guard circuit comprising:
  a delay element having an input connected to the data input of the first latch and configured to generate, at its output, a delayed data signal;
  a gated-input cell having an input coupled to an output of the delay element, the gated-input cell being configured to propagate the delayed data signal during the first state of the first clock signal; and
  a comparator having a first input either connected to the data output of the first latch, or coupled to the data output of the first latch via one or more logic gates, the first input of the comparator not being connected to the data output of the second latch, and a second input coupled to an output of the gated-input cell.

2. The synchronous device of claim 1, further comprising a further latch having a data input coupled to an output of the comparator, the further latch being configured to store an output signal of the comparator during a second state of the first clock signal.

3. The synchronous device of claim 2, wherein the further latch is configured to receive a second clock signal corresponding to the inverse of the first clock signal.

4. The synchronous device of claim 1, further comprising the one or more logic gates for forcing one input of the comparator to a high or low state during a testing phase of the slack guard circuit.

5. The synchronous device of claim 4, wherein the one or more logic gates comprise an AND gate or a NAND gate.

6. The synchronous device of claim 1, wherein the comparator is an XOR gate or an XNOR gate.

7. The synchronous device of claim 1, wherein the second input of the comparator is connected to the output of the gated-input cell, or coupled to the output of the gated-input cell via one or more logic gates.

8. The synchronous device of claim 1, wherein the gated-input cell comprises a pass gate.

9. The synchronous device of claim 8, wherein the pass gate comprises a first transistor having one of its main conducting nodes connected to the input of the gated-input cell and it other main conducting node connected to an output of the pass gate, and a second transistor having one of its main conducting nodes connected to the input of the gated-input cell and it other main conducting node connected to the output of the pass gate, the first and second transistors being controlled based on the first clock signal.

10. The synchronous device of claim 9, wherein the output of the pass gate is the output of the gated-input cell.

11. The synchronous device of claim 9, wherein the gated-input cell further comprises an inverter connecting the output of the pass gate to the output of the gated-input cell.

12. The synchronous device of claim 1, further comprising a multiplexer having a first input coupled to a data input of the synchronous device, a second input coupled to a test input of the synchronous device, and an output providing the data input signal of the first latch.

13. A method of circuit conception implemented by a computer, the method comprising performing static timing analysis on a circuit design to identify at least one synchronous device receiving a data signal with a slack time of less than a threshold duration with respect to a timing edge of a clock signal, and replacing the at least one synchronous device in the circuit design by a modified cell implementing the synchronous device of claim 1.

14. A non-transitory storage medium comprising computer program instructions, when executed by a computer cause the computer to perform the method of claim 13.

15. A computing device configured to execute a computer program causing the method of claim 13 to be implemented.

* * * * *